Reissued Jan. 14, 1930 Re. 17,566

UNITED STATES PATENT OFFICE

JOEL R. BELKNAP, OF CHARLESTON, WEST VIRGINIA

PROCESS FOR ALLAYING DUST IN FUELS

No Drawing. Original No. 1,592,810, dated July 13, 1926. Serial No. 86,962, filed February 8, 1926. Application for reissue filed July 12, 1928. Serial No. 292,318.

This invention relates to a process for treating fuels, as coal, for the purpose of allaying dust and preventing slacking.

Objects of this invention are to provide a new and improved process for allaying dust in fuels and preventing disintegration; and a new and efficient solution which may be cheaply manufactured for allaying dust in fuel, for example coal, as well as preventing slacking so that the fuel may be placed in bins and handled without the creation of objectionable dust.

The freezing points of this solution are sufficiently low so that it is not likely to freeze in the coldest weather; and thus fuels so treated are guarded against the difficulty of freezing solidly together. This latter feature is of cardinal importance also because it will be apparent that the use of water for allaying dust is quite objectionable in cold weather in that the fuel freezes to such an extent as to render it practically impossible to handle. Furthermore, water is not sufficiently capillaceous under all conditions thoroughly to moisten the fuel while an important characteristic of this invention is that percolation of this solution to all parts of the mass is effected.

Coal is often dried by artificial heat or relatively low huminity. The use of some forms of solutions effects a granulation or caking of the dust. Also the particles of dust lose their capacity for accumulating static electricity and its attendant effects. Spontaneous combustion, slacking and disintegration, and the evils in general encountered where solid carbonaceous fuels are handled in exposure to air may accordingly be avoided through the advantageous operation of my invention. Fuel treated by my solution will become quickly moist by deliquescent action when exposed to atmospheric air of normal humidities.

For an example of one solution which I have employed and found admirably useful for the purpose of allaying dust and preventing slacking in connection with the well known New River coals, the following ingredients are used for one ton of the fuel; 5 to 6 gallons of the entire solution made up by adding approximately three pounds of the following compound per gallon of water:

| | Per cent |
|---|---|
| Commercial calcium chloride | 15 |
| Commercial magnesium chloride | 75 |
| Sodium chloride | 9 |
| Sulphurous acid | 1 |

A further example of ingredients for a solution used in the practice of the invention, for one ton of coal is:

| | Per cent |
|---|---|
| Calcium chloride | 22 |
| Magnesium chloride | 75 |
| Sulphurous acid | 3 |

The freezing point of this solution has been found to be approximately 20° F. below zero so that it is apparent that the solution may be used without liability of freezing except in weather which is extremely cold and for such condition the freezing point may be further lowered by varying the specific gravity of the solution. The specific gravity of the solution above given is about 1.2. Under some conditions it may be desirable to reverse the proportions of calcium chloride and magnesium chloride, as for example with Pocahontas coal.

Magnesium chloride and calcium chloride of low grade is used because they are relatively cheap at the present time. It is to be understood that other hygroscopic and deliquescent chemicals may be substituted for calcium or magnesium chloride with equally advantageous results. The low freezing point of these chemicals renders them very satisfactory for the purpose.

The sodium chloride increases the capillary action of the solution and assists percolation thereof to all parts of the mass of coal. The magnesium chloride principally functions to add viscosity to the solution, and lower the freezing point. Sulphurous acid may be included in the solution, for increasing the capillary action or causing the solution to adhere to and moisten the particles of certain fuels.

It has further been found that in dealing with very dry fuels the specific gravity of the solution should be in the region 1.1, and also when very wet fuels are to be treated the specific gravity of the solution should be about 1.4 to obtain the best results.

This solution may be applied to the fuel in any desired manner. It may be sprayed or sprinkled over the fuel, or the fuel may be immersed in the solution.

It is to be understood that I do not wish to be limited to the ingredients and proportions hereinbefore mentioned because this description is given by way of illustration and not of limitation, although it is preferable that a solution having a low freezing point be employed. Accordingly the terms "moisture-attracting substance" and "deliquescent inorganic compound" as used herein are to be understood as connoting any of the several ingredients or mixtures of ingredients above referred to, such as a mixture of calcium and magnesium chlorides in any proportion; either calcium or magnesium chloride alone; or other hygroscopic and deliquescent chemicals or mixtures thereof.

What I claim is:—

1. A process of treating bituminous coal for allaying dust and preventing disintegration, which resides in subjecting the coal to the action of magnesium chloride and sulphurous acid in solution.

2. A process of treating bituminous coal for allaying dust and preventing disintegration, which resides in subjecting the coal to the action of a deliquescent inorganic compound in an aqueous solution having an acid reaction.

3. A process of treating commercial sizes of carbonaceous fuel for handling in exposure to atmospheric conditions, which comprises applying to such fuel and maintaining therewith during handling a deliquescent moisture-attracting substance which lowers the freezing point of water.

4. A solution for treating bituminous coal for allaying dust and preventing disintegration consisting of calcium chloride, sodium chloride, sulphurous acid and magnesium chloride.

5. The process of treating commercial sizes of solid carbonaceous fuel for allaying dust and preventing disintegration, which comprises applying to and maintaining therein during handling and storage a composition having a low freezing point and containing a deliquescent inorganic compound.

Signed by me, this 11th day of July, 1928.

JOEL R. BELKNAP.